United States Patent
Khan et al.

(10) Patent No.: US 11,480,736 B2
(45) Date of Patent: Oct. 25, 2022

(54) FIBER-TO-CHIP COUPLER

(71) Applicants: The Regents of the University of Colorado, a body corporate, Denver, CO (US); Government of the United States of America as represented by the Secretary of Commerce, Gaithersburg, MD (US)

(72) Inventors: Saeed Khan, Lafayette, CO (US); Jeffrey Shainline, Boulder, CO (US)

(73) Assignees: The Regents of the University of Colorado, a body corporate, Denver, CO (US); Government of the United States of America, as represented by the Sec. of Commerce, Gaithersburg, MD (US)

(*) Notice: Subject to any disclaimer, the term of this patent is extended or adjusted under 35 U.S.C. 154(b) by 0 days.

(21) Appl. No.: 17/144,980

(22) Filed: Jan. 8, 2021

(65) Prior Publication Data
US 2021/0215882 A1     Jul. 15, 2021

Related U.S. Application Data

(60) Provisional application No. 62/958,967, filed on Jan. 9, 2020.

(51) Int. Cl.
*G02B 6/30* (2006.01)
*G02B 6/42* (2006.01)
*G02B 6/293* (2006.01)

(52) U.S. Cl.
CPC ......... *G02B 6/305* (2013.01); *G02B 6/29335* (2013.01); *G02B 6/4214* (2013.01); *G02B 6/4239* (2013.01)

(58) Field of Classification Search
CPC .. G02B 6/305; G02B 6/29335; G02B 6/4214; G02B 6/4239
See application file for complete search history.

(56) References Cited

U.S. PATENT DOCUMENTS

| 4,784,466 A | * | 11/1988 | Khoe | G02B 6/4203 385/127 |
| 5,044,723 A | * | 9/1991 | MacDonald | G01F 23/2925 385/12 |

(Continued)

OTHER PUBLICATIONS

Son et al., High-Efficiency Broadband Light Coupling Between Optical Fibers and Photonic Integrated Circuits, Nanophotonics, 2018; 7(12): pp. 1845-1864.

(Continued)

*Primary Examiner* — Ellen E Kim
(74) *Attorney, Agent, or Firm* — Lathrop GPM LLP

(57) ABSTRACT

A fiber-to-chip coupler includes a substrate, a waveguide on a top surface of the substrate, an optical fiber axially aligned to the waveguide, and a cap. The waveguide has a uniform region with uniform width and a tapered-waveguide region having a width that adiabatically increases from a minimum width to the uniform width. The optical fiber has a tapered fiber tip having a minimum core diameter, a cylindrical section having a maximum core diameter, and a tapered-fiber section therebetween. The optical fiber is located at least in part above the tapered-waveguide region, and has a core diameter that adiabatically decreases within a taper length of the tapered-fiber section. The cap extends from the tapered fiber tip toward the cylindrical section, is formed of a second material having a cap refractive index that exceeds a refractive index of the optical fiber, and includes a cap-region disposed on the tapered-waveguide region.

19 Claims, 9 Drawing Sheets

(56) References Cited

U.S. PATENT DOCUMENTS

| | | | | |
|---|---|---|---|---|
| 5,461,692 | A * | 10/1995 | Nagel | G02B 6/03627 |
| | | | | 385/38 |
| 7,099,535 | B2 * | 8/2006 | Bhagavatula | G02B 6/4206 |
| | | | | 385/124 |
| 9,122,037 | B2 * | 9/2015 | Shastri | B32B 37/16 |
| 10,488,596 | B2 * | 11/2019 | Akiyama | G02B 6/12 |
| 10,514,506 | B2 * | 12/2019 | Brusberg | G02B 6/3636 |
| 2016/0103279 | A1 * | 4/2016 | Budd | G02B 6/12004 |
| | | | | 438/31 |
| 2016/0327748 | A1 * | 11/2016 | Stern | G02B 6/305 |
| 2017/0059780 | A1 * | 3/2017 | Budd | G02B 6/245 |

OTHER PUBLICATIONS

Jagerska, Dispersion Properties of Photonic Crystals and Silicon Nanostructures Investigated by Fourier-Space Imaging, htttps://www.researchgate.net/publication/49460024. 153 pages.

* cited by examiner

FIBER-TO-CHIP COUPLER

CROSS-REFERENCE TO RELATED APPLICATIONS

This application claims priority to U.S. provisional patent application Ser. No. 62/958,967, filed on Jan. 9, 2020, the disclosure of which is incorporated herein by reference in its entirety.

GOVERNMENT RIGHTS

This invention was made with government support under Grant No. IARPA 16002-D2018-1806040001 awarded by the Intelligence Advanced Research Projects Activity. The government has certain rights in the invention.

BACKGROUND

A major challenge in the field of integrated photonics is the efficient coupling of light from a standard optical fiber to on-chip photonic waveguides and devices. For applications in digital computing and communications, coupling losses lead to significant contributions to the link power budget. For applications in quantum optics and quantum communication, losses on the order of a few percent may eliminate any quantum advantage.

SUMMARY OF THE EMBODIMENTS

The problem of fiber-to-chip coupling is difficult because the fundamental mode of an optical fiber is roughly ten micrometers in diameter, and the dimensions of the fundamental mode of a high-index-contrast waveguide are often less than one micrometer across. Embodiments herein include fiber-to-chip couplers configured to efficiently couple light from the fundamental mode of a single mode fiber, through a tapering region, into a higher-index cap, and into a submicron waveguide.

In a first aspect, a fiber-to-chip coupler includes a substrate, a waveguide on a top surface of the substrate, an optical fiber axially aligned to the waveguide, and a cap. The waveguide has (i) a uniform region with uniform width in a transverse direction parallel to the top surface, and (ii) a tapered-waveguide region. The tapered-waveguide region has a width that, in an axial direction perpendicular to the transverse direction, adiabatically increases from a minimum width to the uniform width. The minimum width is less than the uniform width. The optical fiber is axially aligned to the waveguide, formed of a first material having a fiber refractive index, and has (i) a tapered fiber tip having a minimum core diameter, (ii) a cylindrical section having a maximum core diameter, and (iii) a tapered-fiber section therebetween. The optical fiber is located at least in part above the tapered-waveguide region, and has a core diameter that, in the axial direction, adiabatically decreases from the maximum core diameter to the minimum core diameter within a taper length of the tapered-fiber section. The cap extends from the tapered fiber tip toward the cylindrical section, is formed of a second material having a cap refractive index that exceeds the fiber refractive index, and includes a cap-region disposed on the tapered-waveguide region. The tapered-waveguide region is between the cap-region and the top surface.

In a second aspect, a fiber-to-chip coupler includes a substrate, a forked waveguide-coupler on a top surface of the substrate, an optical fiber, and a cap. The forked waveguide-coupler has (i) a uniform region with uniform width parallel to the top surface, (ii) a bifurcation boundary at which the uniform region divides into a first branch-waveguide and a second branch-waveguide, and (iii) an inverse-taper region in which a distance between the first and second branch-waveguides adiabatically increases from a minimum distance, at the bifurcation boundary, to a positive width. The optical fiber is formed of a first material having a fiber refractive index, and has (i) a tapered fiber tip having a minimum core diameter that is less than the positive width, (ii) a cylindrical section having a maximum core diameter, and (iii) an adiabatically-tapered region therebetween. At least part of the adiabatically-tapered region is located between the first and second branch-waveguides, and has a core diameter that decreases from the maximum core diameter to the minimum core diameter within a taper length of the adiabatically-tapered region. The cap extends from the tapered fiber tip toward the cylindrical section, and is formed of a second material having a cap refractive index that exceeds the fiber refractive index.

In a third aspect, a method for coupling light from an optical fiber into a waveguide includes adiabatically transferring light propagating in the optical fiber to a tapered region of the optical fiber. The method also includes coupling the transferred light, propagating in the tapered region, to a cladding that is formed on the tapered region and has a refractive index that exceeds a refractive index of the optical fiber; and adiabatically coupling the coupled-transferred light, propagating in the cladding, to a waveguide formed on a substrate.

DETAILED DESCRIPTION OF THE EMBODIMENTS

Figure 1:
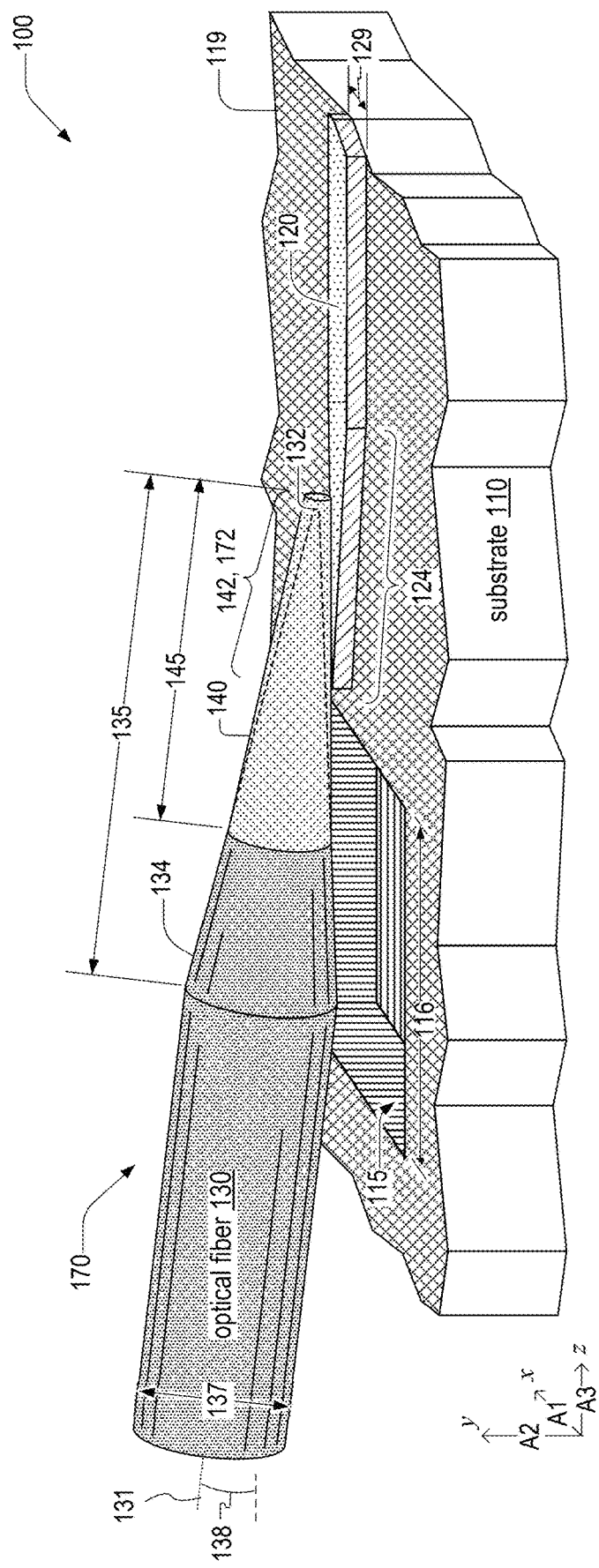
FIGS. 1-3 are respective schematics of a fiber-to-chip coupler, in an embodiment.
Figure 2:
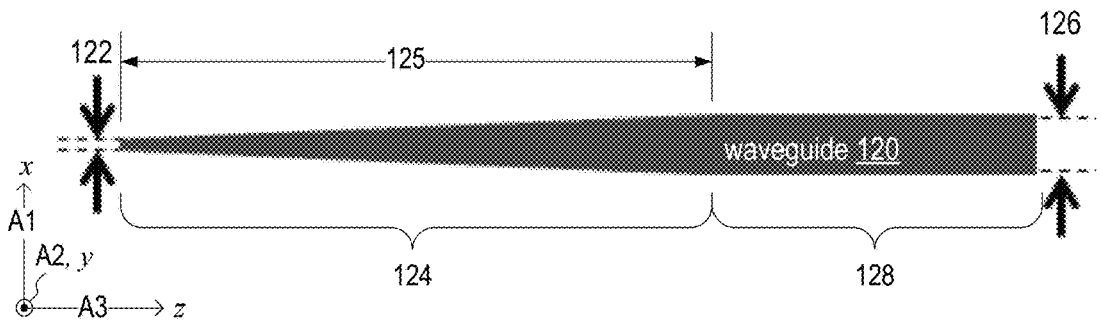
Figure 3:
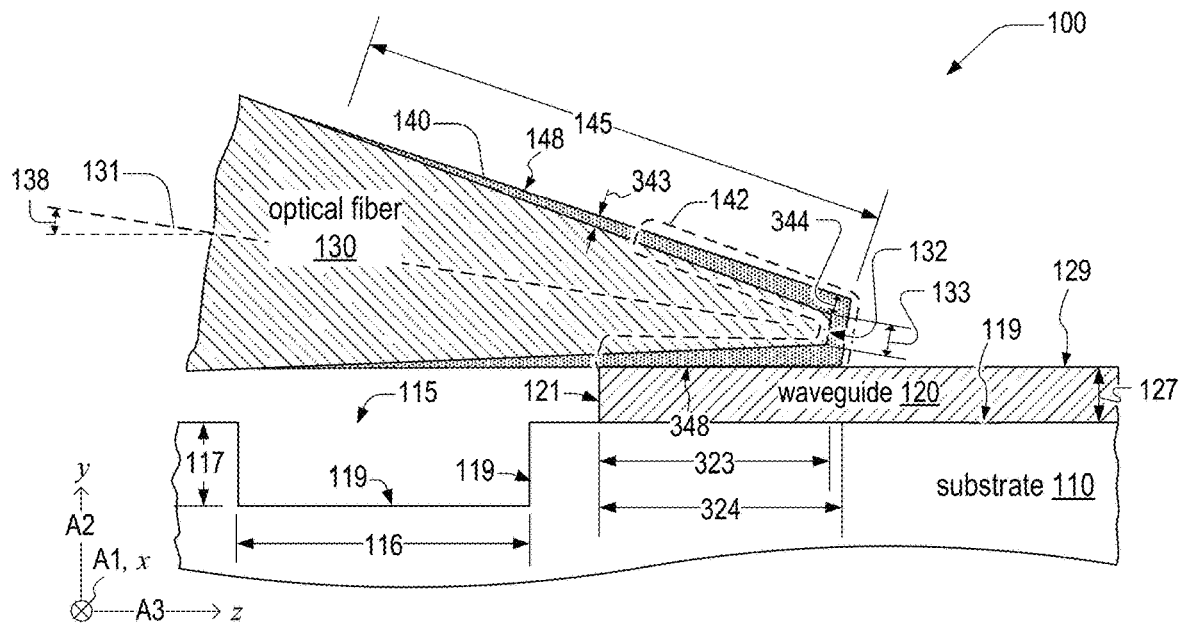

FIG. 1 is a schematic of a fiber-to-chip coupler 100, which includes a substrate 110, a waveguide 120, and a capped tapered fiber 170, which includes an optical fiber 130, and a cap 140. FIG. 2 is a plan view of waveguide 120. FIG. 3 is a cross-sectional view of fiber-to-chip coupler 100. FIGS. 1-3 are best viewed together in the following description.

The cross-section illustrated in FIG. 2 is parallel to a plane, hereinafter the x-z plane, formed by orthogonal axes A1 and A3, which are each orthogonal to an axis A2. The cross-section illustrated in FIG. 3 is parallel to a plane, hereinafter the y-z plane, formed by orthogonal axes A2 and A3, which are each orthogonal to axis A1. Herein, the x-y plane is formed by orthogonal axes A1 and A2, and planes parallel to the x-y plane are referred to as transverse planes. Unless otherwise specified, heights of objects herein refer to the object's extent along axis A2. Herein, a reference to an axis x, y, or z refers to axes A1, A2, and A3 respectively. Also herein, a horizontal plane is parallel to the x-z plane, a width refers to an object's extent along the x axis, and a vertical direction is along the y axis.

Waveguide 120 is on a top surface 119 of substrate 110. Waveguide 120 includes a uniform region 128 having (i) a uniform width 126 parallel to top surface 119, and (ii) a height 127. In embodiments, height 127 is between 200 nm and 240 nm. Waveguide 120 also includes a tapered-waveguide region 124 having a width that adiabatically increases from minimum width 122 to uniform width 126. Minimum width 122 is less than uniform width 126. Tapered-waveguide region 124 has a taper length 125.

Optical fiber 130 is axially aligned to waveguide 120 and is formed of a first material having a refractive index $n_1$. In embodiments, the first material is silicon dioxide. Optical fiber 130 has a tapered fiber tip 132 having a minimum core diameter 133, (ii) a cylindrical section 136 having a maximum core diameter 137, and a tapered-fiber section 134 therebetween. Tapered-fiber section 134 is located above tapered-waveguide region 124, and has a core diameter that adiabatically decreases from maximum core diameter 137 to minimum core diameter 133 within a taper length 135 of tapered-fiber section 134. In embodiments, refractive index $n_1$ exceeds a refractive index $n_{110}$ of substrate 110, which enables total internal reflection of light propagating in waveguide 120 from top surface 119.

Optical fiber 130 has an optical axis 131, which is oriented at an angle 138 with respect to top surface 119. In embodiments, angle 138 is greater than equal to zero. For example, angle 138 may be between three degrees and thirty degrees. In embodiments, maximum core diameter 137 and taper length 135 determine angle 138. Denoting maximum core diameter 137 and taper length 135 as D and L respectively, angle 138 may be equal to arcsin(D/2L). In embodiments, optical fiber 130 is a single-mode optical fiber at free-space wavelengths between 1530 nanometers and 1610 nanometers.

A cap end-region 142 of cap 140 is disposed directly on tapered-waveguide region 124. Tapered-waveguide region 124 is between cap end-region 142 and top surface 119. In embodiments, cap-length 145 is between twenty-five micrometers and two hundred micrometers. FIG. 1 denotes an end-section 172 of capped tapered waveguide 170 that includes cap-end region 142.

From tapered fiber tip 132, cap 140 extends a cap-length 145 toward cylindrical section 136, and is formed of a second material having a refractive index $n_2$ that exceeds the refractive index $n_1$. One aspect of the present embodiments includes the realization that $n_2$'s exceeding $n_1$ enables efficient optical coupling between capped tapered fiber 170 and waveguide 120 by preventing leakage of optical power into a continuum of substrate modes of substrate 110. When $n_2$ exceeds $n_1$, the effective index of an optical mode (or supermode) of cap end-region 142 exceeds the refractive index of substrate 110 in spatial regions where the evanescent field of the optical mode reaches top surface 119, which prevents the aforementioned optical power leakage.

Waveguide 120 has an end surface 121, illustrated in FIG. 3. Above waveguide 120, a thickness of cap 140 increases from a thickness 343 above end surface 121 to a thickness 344 at tapered fiber tip 132. In embodiments, thickness 343 is less than ten nanometers and thickness 334 is between 0.1 micrometers and 1.0 micrometers. Cap 140 has an outer surface 148, which in embodiments includes a region 348 that is at least one of (i) parallel to and (ii) disposed on a top surface 129 of waveguide 120, as illustrated in FIG. 3. In embodiments, region 348 is disposed directly on top surface 129. In embodiments, the shape of outer surface 148 is an outer surface of a truncated cone characterized by an apex angle. Angle 138 may equal half of the apex angle such that region 348 is parallel to top surface 129.

Above top surface 129 and along the z axis, optical fiber 130 and cap 140 extend respective distances 323 and 324 from end surface 121. Distance 324 may exceed distance 323. In embodiments, the length of region 348 in the z direction equals distance 324. Herein, distance 323 is referred to as an interaction length 323, as it corresponds to the length of waveguide 120 over which coupling between capped tapered fiber 170 and waveguide 120 occurs. In embodiments, each of taper lengths 125 and 135 exceeds interaction length 323. In embodiments, at least one of taper lengths 125 and 135 is between one millimeter and three millimeters.

In embodiments, interaction length 323 is significantly greater than a beat length between the coupling waveguides to ensure efficient optical coupling. In the example of fiber-to-chip coupler 100, the coupling waveguides are end-section 172 and tapered-waveguide region 124. This beat length, herein after $z_{b1}$, is a function of respective propagation constants $\beta_{172}$ and $\beta_{124}$ of optical modes propagating in end section 172 and tapered-waveguide region 124: $z_{b1}=2\pi/(\beta_{172}-\beta_{124})$. In embodiments, interaction length 323 is greater than $5_{b1}$.

Cap 140 covers at least part of tapered-fiber section 134. In embodiments, cap-length 145 is greater than or equal to taper length 135, such that cap 140 covers all of tapered-fiber section 134, and may also extend to cover part of cylindrical section 136. While such caps are easier to fabricate than those that only partially cover tapered-fiber section 134, they may exhibit more loss.

In embodiments, each of substrate 110, waveguide 120, and cap 140 is formed of a dielectric, a semiconductor, or a combination thereof. Substrate 110 may be formed of an oxide, waveguide 120 may be silicon or silicon nitride, and cap 140 may be formed of an epoxy-based photoresist, such as SU-8, silicon nitride, or amorphous silicon. In embodiments, waveguide 120 has a rectangular cross-section.

In embodiments, top surface 119 forms a trench 115, illustrated in FIGS. 1 and 3. A technical benefit of trench 115 is to further reduce leakage to substrate modes by allowing the evanescent tail of a mode (or supermode) of cap end-region 142 to extend beyond the material structure without coupling to undesired modes of substrate 110. Trench 115 has a length 116 and a depth 117 in z and y directions respectively. In embodiments, depth 117 is between 1.5 micrometers and 2.0 micrometers. In the x direction, trench 115 has a width that, in embodiments, is greater than or equal to maximum core diameter 137. In embodiments, substrate 110 does not include trench 115, such that the region of top surface 119 shown in FIG. 1 is flat.

Figure 4:
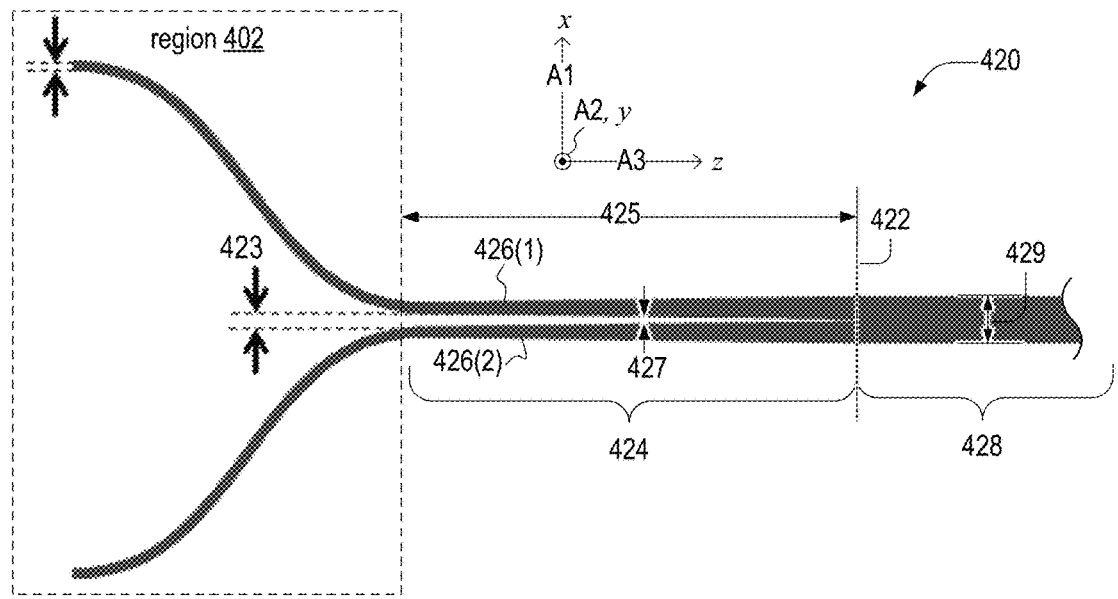
FIG. 4 is a plan view of a forked waveguide-coupler, which may replace the waveguide of the fiber-to-chip coupler of FIGS. 1-3, in an embodiment.

FIG. 4 is a plan view of a forked waveguide-coupler 420, which may replace waveguide 120 in embodiments of fiber-to-chip coupler 100. Forked waveguide-coupler 420 includes a uniform region 428, an inverse-taper region 424, and a bifurcation boundary 422 therebetween. Inverse-taper region 424 has a taper length 425 and includes a first branch-waveguide 426(1) and a second branch-waveguide 426(2). Uniform region 428 has a uniform width 429, which is analogous to uniform width 126. At bifurcation boundary 422, uniform region 428 bifurcates into branch-waveguides 426(1) and 426(2). In inverse-taper region 424, branch-waveguides 426(1) and 426(2) are separated by a branch separation 427, which adiabatically increases from a minimum distance at bifurcation boundary 422, to a width 423. In embodiments, width 423 exceeds minimum core diameter 133. In embodiments, forked waveguide-coupler 420 includes a region 402 adjacent to inverse-taper region 424, in which branch-waveguides 426 maintain a constant width. The minimum distance may equal zero.

Figure 5:
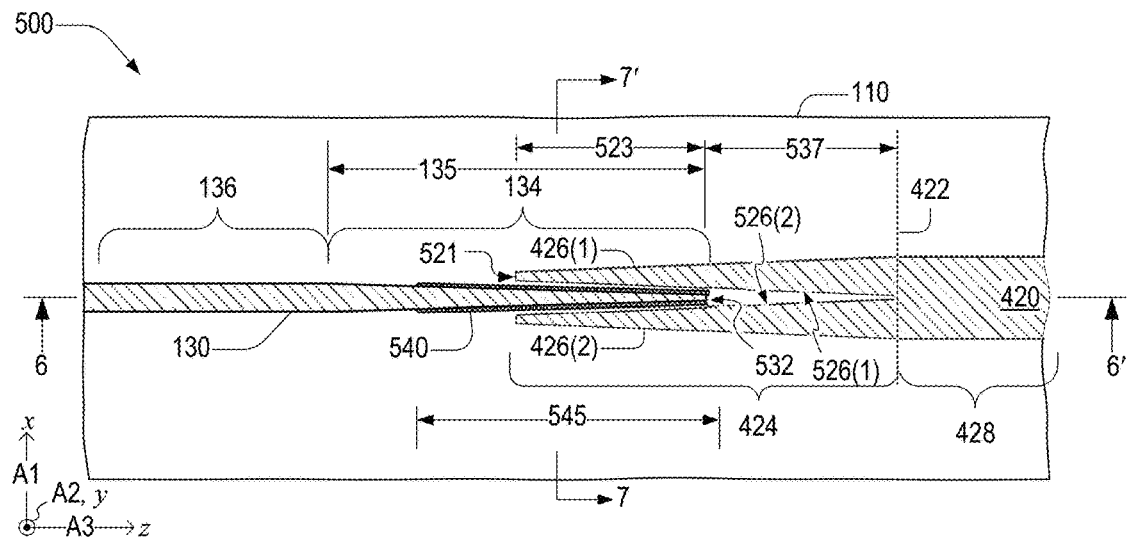
FIGS. 5-7 are respective schematics of a fiber-to-chip coupler that includes the forked waveguide-coupler of FIG. 4, in an embodiment.

FIG. 5 is a schematic plan view of a fiber-to-chip coupler 500, which includes substrate 110, forked waveguide-coupler 420, and a capped tapered fiber 570. Capped tapered fiber 570 is an example of capped tapered fiber 170 and includes optical fiber 130 and a cap 540 thereon. One aspect of the present embodiments includes the realization that compared to fiber-to-chip coupler 100, the coupling configuration of fiber-to-chip coupler 500 benefits from increased mechanical stability, ease of alignment, and tolerance to vibrations.

Figure 6:
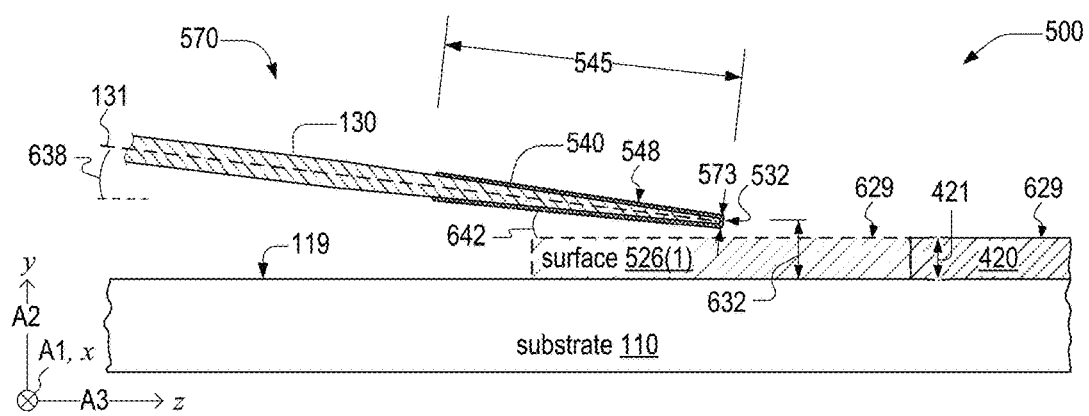

FIG. 6 is a cutaway view of fiber-to-chip coupler 500 in a cross-sectional plane 6-6', where the viewing direction is the positive x direction. Cross-sectional plane 6-6' is parallel to the y-z plane and includes optical axis 131 of optical fiber 130.

Figure 7:
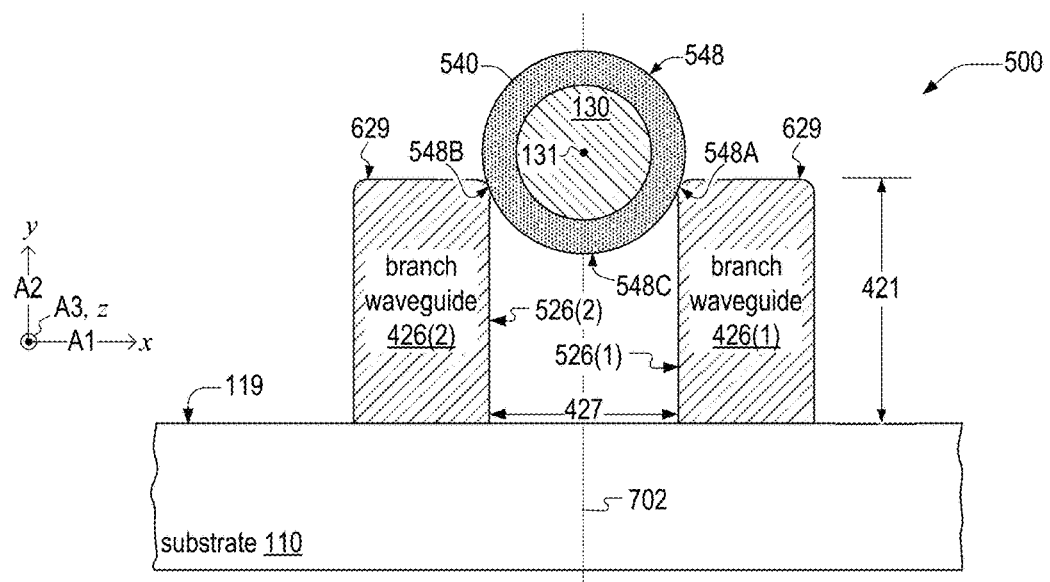

FIG. 7 is a cross-sectional view of fiber-to-chip coupler 500 in a cross-sectional plane 7-7', which is parallel to the x-y plane. FIGS. 5-7 are best viewed together in the following description. While branch-waveguides 426 are not in cross-sectional plane 6, FIG. 6 illustrates a branch-waveguide 426(1) with a dashed border for clarity of description. In the example of FIGS. 5 and 6, forked waveguide-coupler 420 does not include region 402. Along the z axis, tapered fiber tip 532 and bifurcation boundary 422 are separated by a distance 537, which is less than taper length 425. In embodiments, distance 537 equals zero.

Cap 540 is an example of cap 140 and has a cap-length 545. From tapered fiber tip 532, cap 540 extends a distance, equal to cap-length 545, toward cylindrical section 136. Cap 540 is formed of a material having refractive index $n_2$.

Optical fiber 130 is axially aligned to forked waveguide-coupler 420. At tapered fiber tip 532, capped tapered fiber 570 has a diameter 573 that is less than width 423. In embodiments, at least part of tapered-fiber section 134 is between branch-waveguides 426(1) and 426(2) in a cross-sectional plane parallel to top surface 119, as shown in FIG. 5. Forked waveguide-coupler 420 has a thickness 421 with respect to top surface 119. Tapered fiber tip 532 is located at a height 632 above top surface 119. In embodiments, height 632 exceeds thickness 421. In embodiments, height 632 is less than thickness 421, such that in cross-sectional plane 6-6', at least part of tapered-fiber section 134 is between branch-waveguides 426(1) and 426(2). In other embodiments, distance 537 is the distance from bifurcation plane at which branch separation 427 equals diameter 573 of capped tapered fiber 570 at tapered fiber tip 532.

Forked waveguide-coupler 420 and cap 540 have a top surface 629 and an outer surface 548 respectively. Branch-waveguides 426(1,2) have respective inner surfaces 526(1, 2). In embodiments, capped tapered fiber 570 is disposed on forked waveguide-coupler 420 such that outer surface 548 is in direct contact with or bonded to at least one of (i) top surface 629, (ii) inner surface 526(1), (iii) inner surface 526(2), (iv) a first edge surface at an interface between top surface 629 and inner surface 526(1), and (v) a second edge surface at an interface between top surface 629 and inner surface 526(2). For example, outer surface 548 may be tangential to both a surface of branch-waveguides 426(1,2) in cross-sectional plane 7-7', as illustrated in FIG. 7. Outer surface 548 includes (i) a surface region 548A disposed on branch-waveguide 426(1), (ii) a surface region 548B disposed on branch-waveguide 426(2), and (iii) a surface region 548C located between branch-waveguides 426(1) and 426(2). In cross-sectional plane 7-7', surface region 548C is between surface regions 548A and 548B.

FIG. 7 also illustrates that, in embodiments, capped tapered fiber 570 intersects a plane that includes top surface 629 at a height equal to thickness 421 above top surface 119. Furthermore, FIG. 7 illustrates that, in embodiments, forked waveguide-coupler 420 and capped tapered fiber 570 exhibit mirror symmetry in a plane 702 that includes optical axis 131 and is perpendicular to top surface 119.

FIG. 5 denotes an end surface 521 of forked waveguide-coupler 420. Optical fiber 130 extends a distance 523 from end surface 521 toward bifurcation boundary 422. Herein, distance 523 is also referred to as an interaction length 523, as it denotes a length over which coupling between optical fiber 130 and forked waveguide-coupler 420 occurs. Cross-sectional plane 7-7' intersects interaction length 523, and may qualitatively represent more than one cross-section within interaction length 523 and parallel to the x-y plane. That is, the transverse dimensions of optical fiber 130, cap 540, and branch separation 427 shown in FIG. 5 depend on the location of cross-sectional plane 7-7' within interaction length 523. In embodiments, each of taper lengths 425 and 135 exceeds interaction length 323. In embodiments, at least one of taper lengths 135 and 425 is between one millimeter and three millimeters.

In embodiments, interaction length 523 is significantly greater than a beat length between the coupling waveguides to ensure efficient optical coupling. In the example of waveguide coupler 500, the coupling waveguides are end-section 172 and branch-waveguides 426. This beat length, herein after $z_{b4}$, is a function of respective propagation constants $\beta_{172}$ and $\beta_{426}$ of optical modes propagating in end-section 172 and each of branch-waveguides 426: $z_{b4} = 2\pi/(\beta_{172}-\beta_{426})$. In embodiments, interaction length 523 is greater than $5z_{b4}$.

In cross-sectional plane 6-6', FIG. 6, outer surface 548 is oriented at an angle 642 with respect to top surface 629, and/or a plane that includes top surface 629. In embodiments, angle 642 equals zero such that part outer surface 548 facing top surface top surface 629 is parallel to top surface 629. In fiber-to-chip coupler 500, optical axis 131 of optical fiber 130 is oriented an angle 638 with respect to top surface 119. In embodiments, angle 638 is greater than or equal to zero. In embodiments, the shape of outer surface 548 is that of an outer surface of a truncated cone characterized by an apex angle. Angle 638 may equal half of the apex angle such that angle 642 equals zero.

Figure 8:
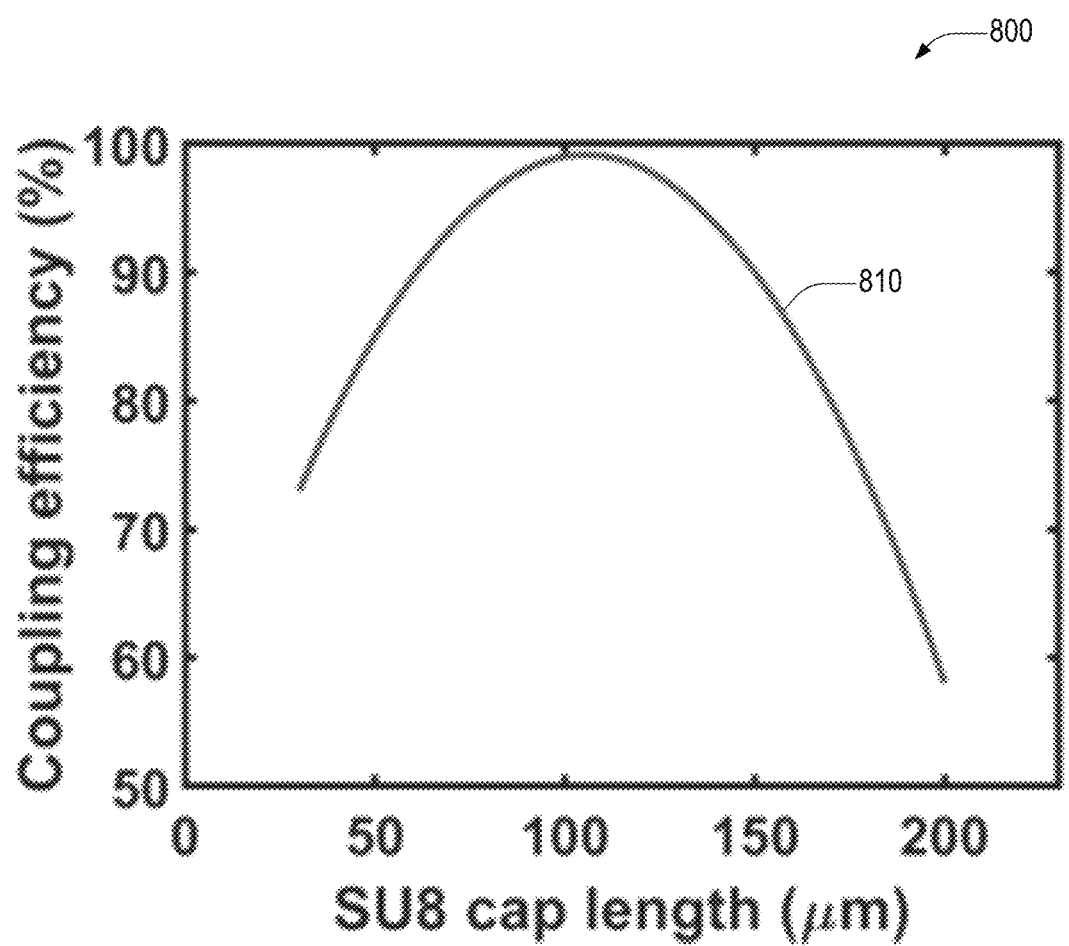
FIG. 8 is a plot showing coupling efficiency of an embodiment of the fiber-to-chip coupler of FIGS. 5-7 as a function of cap-length.

FIG. 8 is a plot 800 showing coupling efficiency 810 of embodiments of fiber-to-chip coupler 100 as a function of a range of cap-length values, each of which are example values of cap-length 145. In the embodiments of fiber-to-chip coupler 100 characterized in plot 800, taper length 135 is two millimeters and waveguide 120 is formed of silicon mononitride (SiN). Coupling efficiency 810 has a local maximum at cap-length value equal to approximately 110 micrometers.

Figure 9:
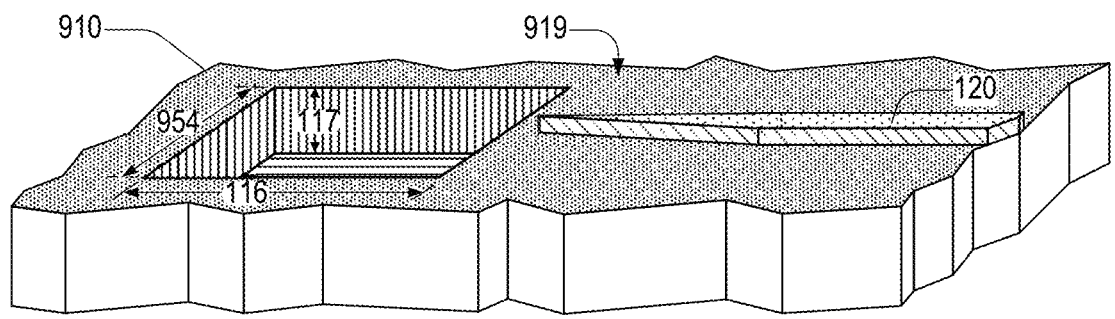
FIGS. 9 and 10 are respective schematics of a substrate, each of which is an example of a substrate of the fiber-to-chip coupler of FIG. 1.

FIG. 9 is a schematic of a substrate 910 with waveguide 120 thereon. Substrate 910 is an example of substrate 110, FIG. 1. Substrate 910 includes a top surface 919 that forms a trench 950, which is an example of trench 115. Trench 950 has length 116, depth 117 and a width 954. In embodiments, width 954 is between ten micrometers and twenty micrometers.

Figure 10:
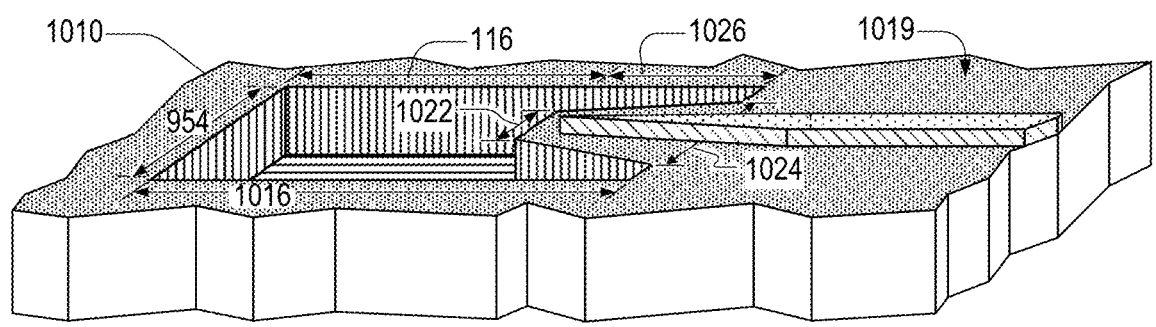

FIG. 10 is a schematic of a substrate 1010 with waveguide 120 thereon. Substrate 1010 is an example of substrate 110, FIG. 1. Substrate 1010 includes a top surface 1019 that forms a trench 1050, which is an example of trench 115. Dimensions of trench 1050 include a length 1016, depth 117, and width 954. Substrate 1010 includes a protrusion 1020 that, in embodiments, supports at least part of tapered-waveguide region 124 of waveguide 120. Protrusion 1020 results in trench 1050 having a concave shape in a horizontal plane that intersects substrate 1010. Protrusion 1020 has a top width 1022, a bottom width 1024, and a length 1026. Length 1016 equals the sum of lengths 116 and 1026. Bottom width 1024 is less than or equal to width 954 and, in embodiments, is greater than uniform width 126. In embodiments, top width 1022 is less than or equal to bottom width 1024, such that a shape of protrusion 1020 is one of rectangular, trapezoidal, or triangular in a horizontal plane that intersects substrate 1010. In embodiments, length 1026 equals or exceeds interaction length 323 and is less than taper length 125. In embodiments, top width 1022 is at least three times minimum width 122 of waveguide 120.

Tapered Fiber Fabrication

Figure 11:
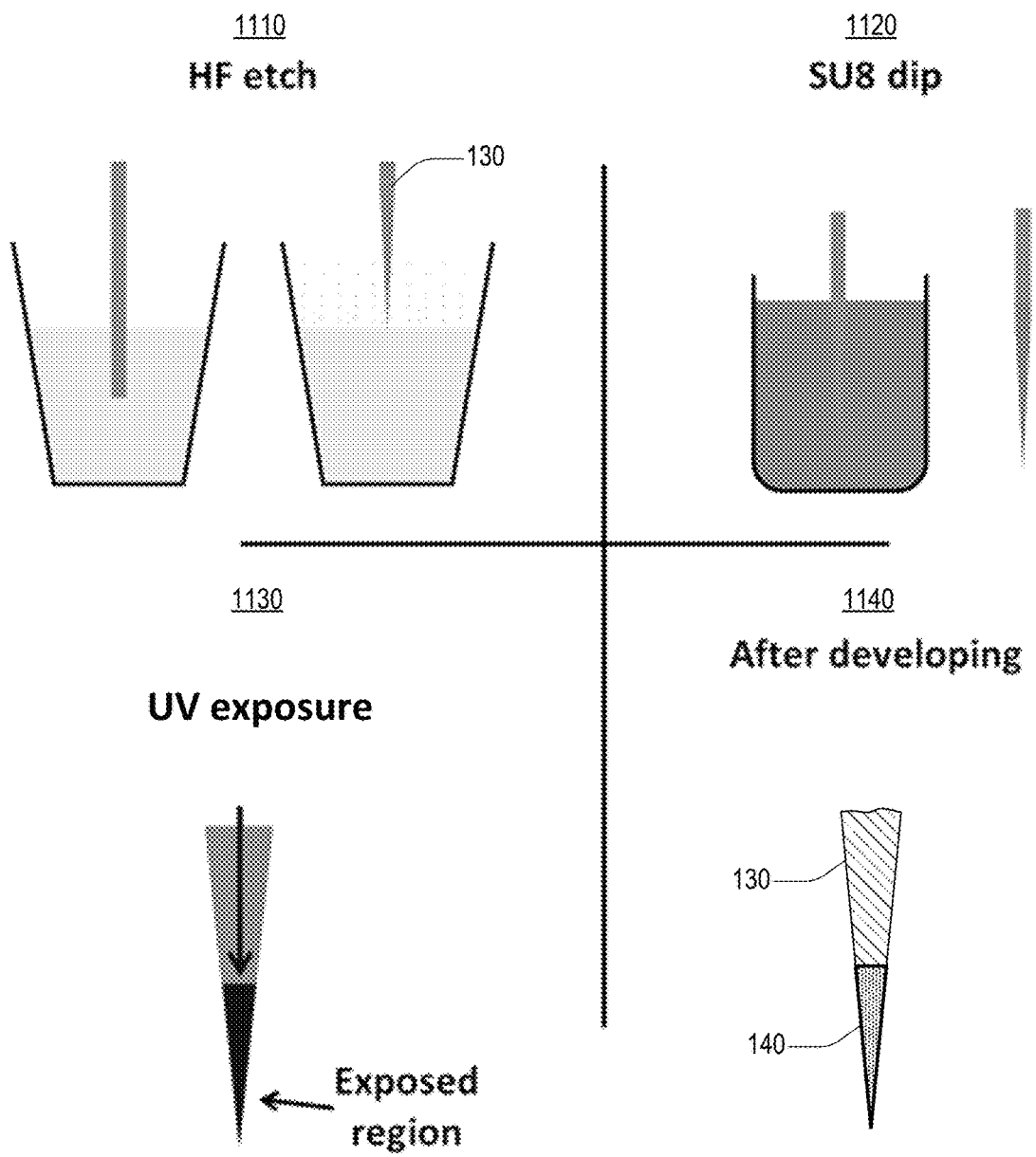
FIG. 11 illustrates steps for fabricating a capped tapered fiber, in an embodiment.

In embodiments, capped tapered fibers 170 are fabricated with a wet etching procedure using hydrofluoric acid (HF). FIG. 11 shows fabrication steps 1110, 1120, 1130, and 1140 included in the fabrication of an SU8-capped tapered fiber, which is an example of capped tapered fiber 170. In step 1110, the acrylic layer an optical fiber is removed, with hot sulfuric acid for example. The optical fiber is an example of optical fiber 130, and may be an single-mode optical fiber. This method of removal is advantageous, as mechanical stripping leads to microcracks that penetrate and deepen during subsequent HF etching.

In embodiments, an single-mode optical fiber is etched using an HF solution, e.g., a 35% HF solution. The etch time may range between 1.5 hours and 2.5 hours. In embodiments, the etch time is two hours. During this time, both the liquid- and vapor-phase HF contribute to the profile of the etched fiber. The section of the fiber submerged in HF completely dissolves, while the section above the HF etches in a tapered profile with a sub-micron tip. The etching of the section of the fiber above the liquid might result from a combination of liquid HF being drawn up the fiber by capillary action as well as etching by HF vapors. Both the liquid and vapor etchants decrease in concentration with height above the liquid, leading to a tapered fiber profile.

Figure 12:
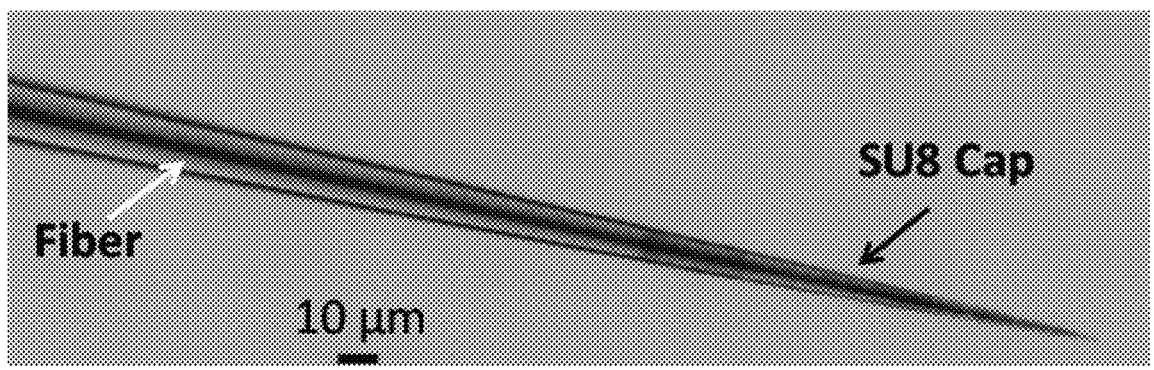
FIG. 12 is a microscope image of a capped tapered fiber fabricated using the steps illustrated in FIG. 11, in an embodiment.

In embodiments, a thorough clean with hot sulfuric acid is performed after the HF etch. The fiber taper was then inserted into SU8 photosensitive polymer (fabrication step 1120 in FIG. 11) and subsequently exposed using 365 nm ultraviolet (UV) light. To produce a thin cladding on the surface of the fiber only around the tip (i.e., the cap), the SU8 polymer is exposed by sending UV light inside the fiber (fabrication step 1130 in FIG. 11) using a fiber-coupled LED the emits an ultraviolet light (e.g., center wavelength $\lambda_0=365$ nm) and output power of between eight and twelve milliwatts (e.g. ten milliwatts). In embodiments, only a fraction of the LED power is available for the exposure due to the core diameter mismatch between the LED's multimode patch cord and the single-mode optical fiber. The core diameter of the multimode patch cord was 400 μm, and single-mode optical fiber was coupled to this multimode patch cord using a bare fiber adaptor. As the evanescent tail of the UV guided mode leaks outside the $SiO_2$ of the fiber taper, more SU8 polymer is gradually exposed down the length of the taper, leading to a polymer cap (e.g., cap 140) of gradually increasing thickness. In fabrication step 1140, the fiber is developed, leaving an SU8 cap on the tip without an abrupt fiber/SU8 interface. FIG. 12 shows a microscope image of a completed capped tapered fiber, which is an example of caped tapered fiber 170.

Experimental Characterization

Figure 13:
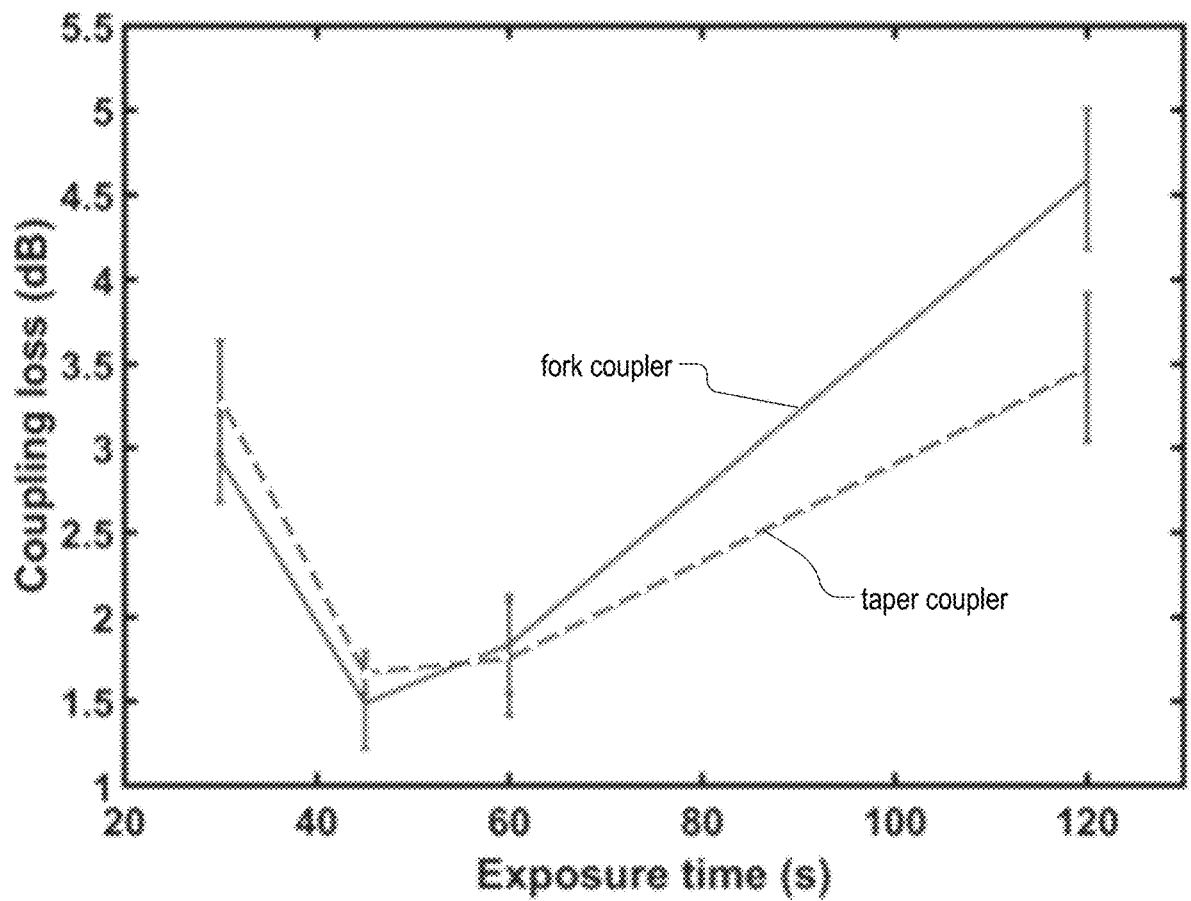
FIG. 13 is a plot of insertion loss through tapered couplers and fork couplers as a function of exposure time.

Insertion loss between cap 140 and waveguide 120 depends on the thickness profile of cap 140. This profile can be adjusted by the UV exposure time, with longer exposure leading to a thicker, longer cap. FIG. 13 is a plot of insertion loss through taper couplers (examples of waveguide 120) and fork couplers (examples of forked waveguide-coupler 420) as a function of exposure time. The error bars in FIG. 13 were obtained by manufacturing multiple tapers in different fabrication batches and measuring their performance when coupling to the same waveguide structure. The error bars represent the standard deviation of these measurements. Variation in coupler loss was due to wet etching and manual application of the SU8 on the fiber by dipping. The amount of SU8 remaining on the fiber taper before exposure and development depends on the speed at which the fiber is removed from the SU8. Fast removal results in more SU8 remaining on the fiber. This excess SU8 gathers into a bead at the fiber tip. This bead is difficult to remove with the standard developing procedure and leads to decreased coupling efficiency. One important insight from FIG. 13 is that a relatively broad range of exposure times provides similar coupling, indicating robustness with respect to this processing condition.

Packaging

For many applications, coupling light from a fiber to a waveguide is only useful if the assembly can be packaged in a manner that enables deployable systems. This is often accomplished by aligning fibers to coupling structures and fixing them in place with epoxy. However, epoxies useful for such packaging have an index of refraction very close to that of the SU8 used as cap 140 and would lead to high losses. Accordingly, in embodiments, capped tapered fiber 170 is fixed with epoxy in a groove etched in a separate carrier chip, which may be formed of silicon. The tapered region of the fiber extends beyond the carrier chip so that it can be placed on the waveguide device chip.

In embodiments, the carrier chips are fabricated by etching channels using deep reactive ion etching. The transverse dimensions—depth and width—of each channel may be between 30 μm and 70 μm. The tapered fibers are epoxied to the carrier chips. After placing the fiber into the channel, epoxy is delivered to the channel through a delivery compartment etched on the same fiber carrier chip. For packaging, the device chip is first mounted, with an epoxy for example, on a carrier substrate such as a glass slide. When aligning a capped tapered fiber 170 to the device chip (e.g., substrate 110 with waveguide 120 thereon), the carrier chip is held by vacuum suction. After capped tapered fiber 170 is aligned to the device chip, the carrier chip is fixed in place on the carrier substrate. To perform this step, an epoxy is applied on the carrier substrate close to the carrier chip. Due to surface tension, the epoxy is drawn between the carrier chip and the carrier substrate and spreads uniformly under the carrier chip. Height adjustment to realign capped tapered fiber 170 is often needed after the application of the epoxy. The alignment and packaging procedure are conducive to automation with machine vision and feedback from optical transmission.

Figure 14:
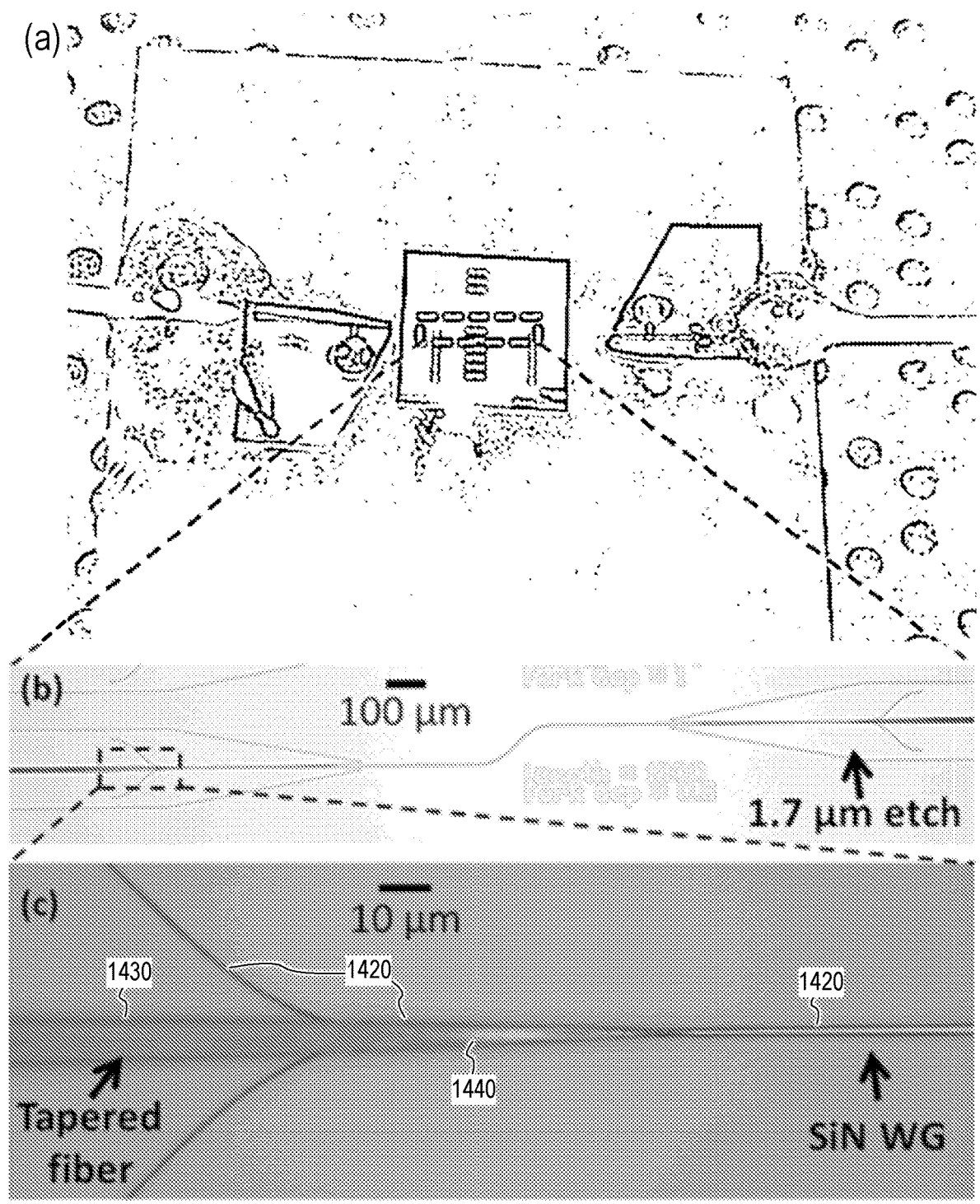
FIG. 14 is an image of a packaged device that includes an embodiment of the fiber-to-chip coupler of FIGS. 5-7.

FIG. 14(*a*) shows a packaged device, while FIG. 14(*b*) shows a zoom of the s-shaped 1.8 mm-long SiN waveguide with forked waveguide-couplers and tapered fibers on either side. FIG. 14(*c*) shows a tapered fiber 1430 aligned on the forked waveguide-coupler 1420 in the packaged device. Tapered fiber 1430 is capped with a cap 1440 formed of SU8. Forked waveguide-coupler 1420, tapered fiber 1430, and cap 1440 are examples of forked waveguide-coupler 420, optical fiber 130, and cap 140 respectively.

Figure 15:
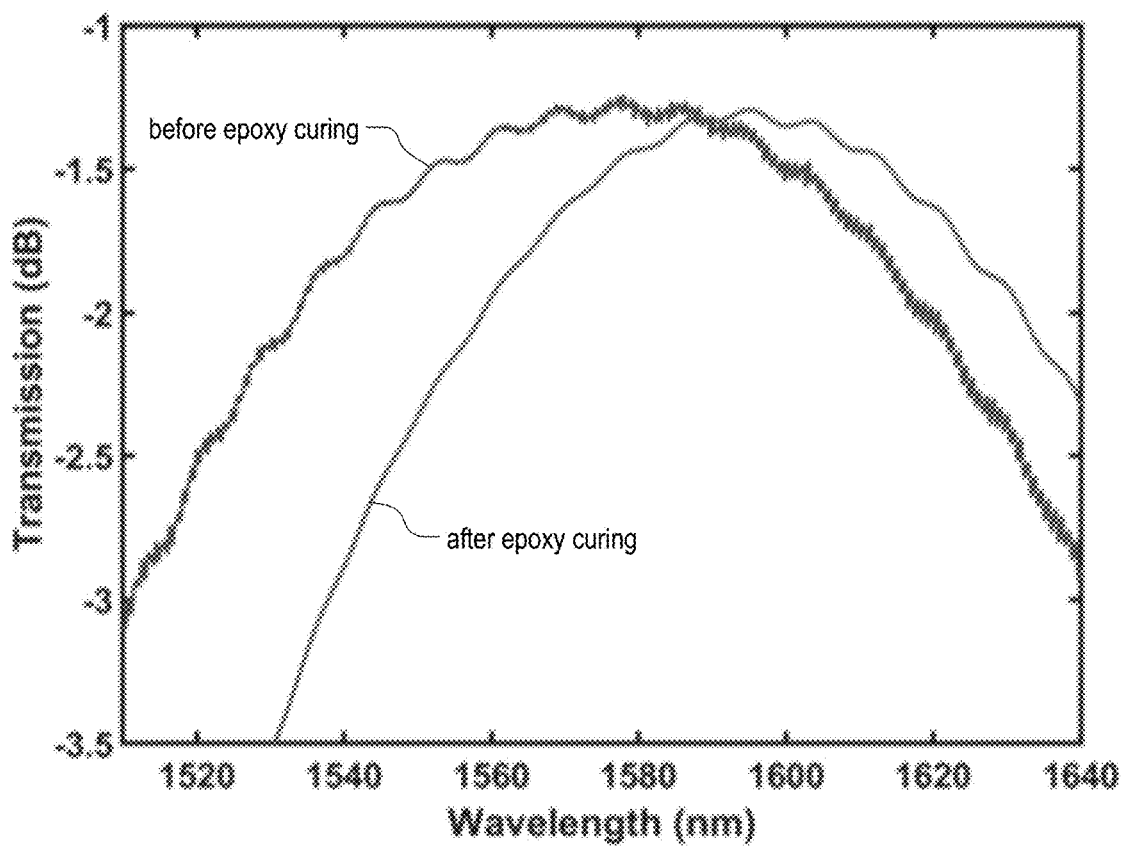
FIG. 15 shows transmission spectrum of a forked waveguide-coupler of FIG. 4 before the application of epoxy and after curing the epoxy.

These devices were measured before and after epoxy was applied and cured. FIG. 15 shows the transmission spectrum of forked waveguide-coupler 1420 before the application of epoxy underneath the carrier chip and after the epoxy has been cured on both sides. The spectrum shifts due to a slight adjustment in the longitudinal position of tapered fiber 1430 relative to forked waveguide-coupler 1420. This adjustment can be pre-compensated prior to delivering and curing the epoxy.

Figure 16:
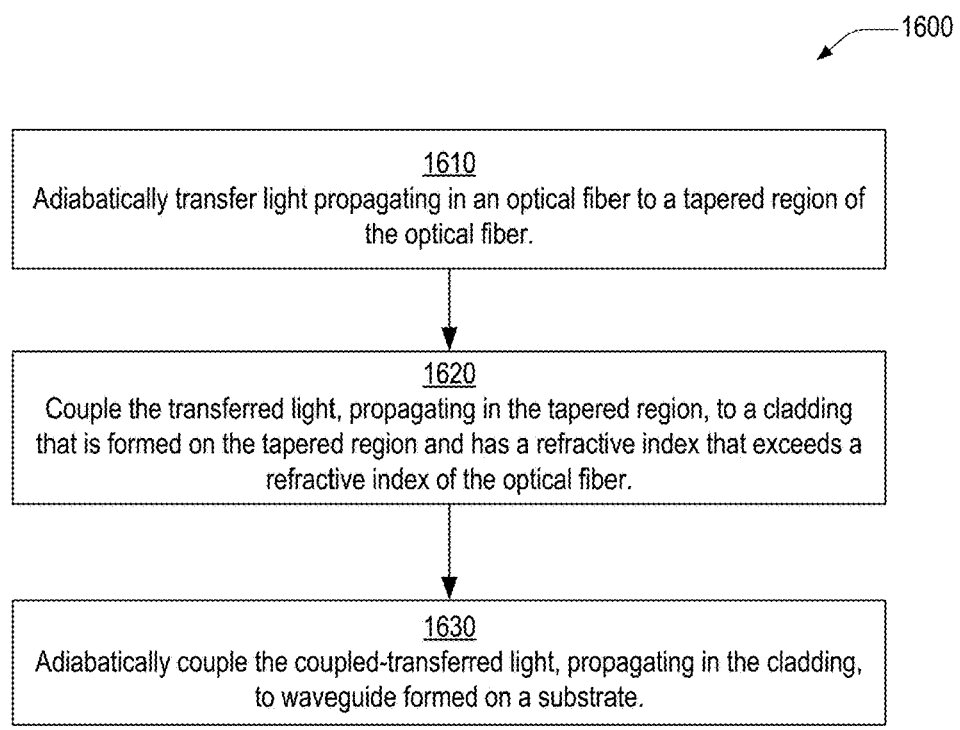
FIG. 16 is a flowchart illustrating a method for coupling light from an optical fiber into a waveguide, in an embodiment.

FIG. 16 is a flowchart illustrating a method 1600 for coupling light from an optical fiber into a waveguide. Method 1600 includes steps 1610, 1620, and 1630. In embodiments, method 1600 is implemented with fiber-to-chip coupler 100, FIGS. 1-3, or fiber-to-chip coupler 500, FIGS. 4-7.

Step 1610 includes adiabatically transferring light propagating in the optical fiber to a tapered region of the optical fiber. In an example of step 1610, light propagating in cylindrical section 136 of optical fiber 130 adiabatically transfers to tapered-fiber section 134 of optical fiber 130.

Step 1620 includes coupling the transferred light, propagating in the tapered region, to a cladding that is formed on the tapered region and has a refractive index that exceeds a refractive index of the optical fiber. In a first example of step 1620, light propagating in tapered-fiber section 134 of optical fiber 130 is adiabatically coupled to cap 140 of capped tapered fiber 170, FIG. 1. In a second example of step 1620, light propagating in tapered-fiber section 134 of optical fiber 130 is adiabatically coupled to cap 540 of capped tapered fiber 570, FIG. 5.

Step 1630 includes adiabatically coupling the coupled-transferred light, propagating in the cladding, to a waveguide formed on a substrate. In a first example of step 1630, fiber-to-chip coupler 100 is used to implement method 1600. In this first example, light propagating in cap 140 of capped tapered fiber 170 is adiabatically coupled to waveguide 120. In a second example of step 1630, fiber-to-chip coupler 500 is used to implement method 1600. In this second example, light propagating in cap 540 of capped tapered fiber 570 is adiabatically coupled to forked waveguide-coupler 420.

Changes may be made in the above methods and systems without departing from the scope of the present embodiments. It should thus be noted that the matter contained in the above description or shown in the accompanying drawings should be interpreted as illustrative and not in a limiting sense. Herein, and unless otherwise indicated the phrase "in embodiments" is equivalent to the phrase "in certain embodiments," and does not refer to all embodiments. The following claims are intended to cover all generic and specific features described herein, as well as all statements of the scope of the present method and system, which, as a matter of language, might be said to fall therebetween.

What is claimed is:

1. A fiber-to-chip coupler comprising:
a substrate having a top surface;
a waveguide on the top surface, having (i) a uniform region with uniform width in a transverse direction parallel to the top surface, and (ii) a tapered-waveguide region having a width that, in an axial direction perpendicular to the transverse direction, adiabatically increases from a minimum width to the uniform width;
an optical fiber axially aligned to the waveguide, formed of a first material having a fiber refractive index, and having (i) a tapered fiber tip having a minimum core diameter, (ii) a cylindrical section having a maximum core diameter, and (iii) a tapered-fiber section therebetween, located at least in part above the tapered-waveguide region, and having a core diameter that, in the axial direction, adiabatically decreases from the maximum core diameter to the minimum core diameter within a taper length of the tapered-fiber section; and
a cap extending from the tapered fiber tip toward the cylindrical section, being formed of a second material having a cap refractive index that exceeds the fiber refractive index, and including a cap-region disposed on the tapered-waveguide region, the tapered-waveguide region being between the cap-region and the top surface.

2. The fiber-to-chip coupler of claim 1, the tapered-fiber section including a tapered-fiber subsection not covered by the cap-region, the top surface forming a trench beneath at least part of the tapered-fiber subsection.

3. The fiber-to-chip coupler of claim 2, a depth of the trench with respect to the top surface being between 1.5 micrometers and 2.0 micrometers.

4. The fiber-to-chip coupler of claim 2, the trench including a region adjacent to the waveguide in the transverse direction.

5. The fiber-to-chip coupler of claim 1, the cap refractive index exceeding a refractive index of the substrate.

6. The fiber-to-chip coupler of claim 1, an outer surface of the cap including a surface-region in direct contact with a top surface of the waveguide.

7. The fiber-to-chip coupler of claim 6, in a cross-sectional plane perpendicular to the top surface and intersecting both the waveguide and an optical axis of the optical fiber, the surface-region being parallel to the top surface and having a length equal to a length of the cap directly above the waveguide.

8. The fiber-to-chip coupler of claim 1, the cap having a cap length along an optical axis of the optical fiber, the cap length exceeding a beat length between a fundamental mode of the optical fiber and a fundamental mode of the waveguide.

9. The fiber-to-chip coupler of claim 8 the beat length being equal to $2\pi/(\beta_f - \beta_w)$, where $\beta_f$ and $\beta_w$ are respective propagation constants of the fundamental mode of the adiabatically-tapered region and the fundamental mode of the tapered-waveguide region.

10. The fiber-to-chip coupler of claim 1, the cap being formed of a polymer material.

11. The fiber-to-chip coupler of claim 10, the polymer material being an epoxy-based negative photoresist.

12. The fiber-to-chip coupler of claim 11, the epoxy-based negative photoresist being SU-8.

13. The fiber-to-chip coupler of claim 1, the substrate being formed of an oxide material.

14. The fiber-to-chip coupler of claim 1, a refractive index of the waveguide exceeding a refractive index of the substrate.

15. The fiber-to-chip coupler of claim 1, the waveguide being formed of silicon nitride.

16. A fiber-to-chip coupler comprising:
a substrate having a top surface;
a forked waveguide-coupler on the top surface, having (i) a uniform region with uniform width parallel to the top surface, (ii) a bifurcation boundary at which the uniform region divides into a first branch-waveguide and a second branch-waveguide, and (iii) an inverse-taper region in which a distance between the first and second branch-waveguides adiabatically increases from a minimum distance, at the bifurcation boundary, to a positive width;
an optical fiber, formed of a first material having a fiber refractive index, and having (i) a tapered fiber tip having a minimum core diameter that is less than the positive width, (ii) a cylindrical section having a maximum core diameter, and (iii) an adiabatically-tapered region therebetween, at least part of which is located between the first and second branch-waveguides, and having a core diameter that decreases from the maximum core diameter to the minimum core diameter within a taper length of the adiabatically-tapered region; and
a cap extending from the tapered fiber tip toward the cylindrical section, and being formed of a second material having a cap refractive index that exceeds the fiber refractive index.

17. The fiber-to-chip coupler of claim 16, the cap having a cap length along an optical axis of the optical fiber, the cap length exceeding a beat length between a fundamental mode of the adiabatically-tapered region and a fundamental mode of the inverse-taper region.

18. The fiber-to-chip coupler of claim 16, the cap including (i) a first surface region disposed on the first branch-waveguide, (ii) a second surface region disposed on second first branch-waveguide, and (iii) a third surface region located between the first branch-waveguide and the second branch-waveguide.

19. The fiber-to-chip coupler of claim 16, the cap refractive index exceeding a refractive index of the substrate.

* * * * *